Patented Feb. 25, 1930

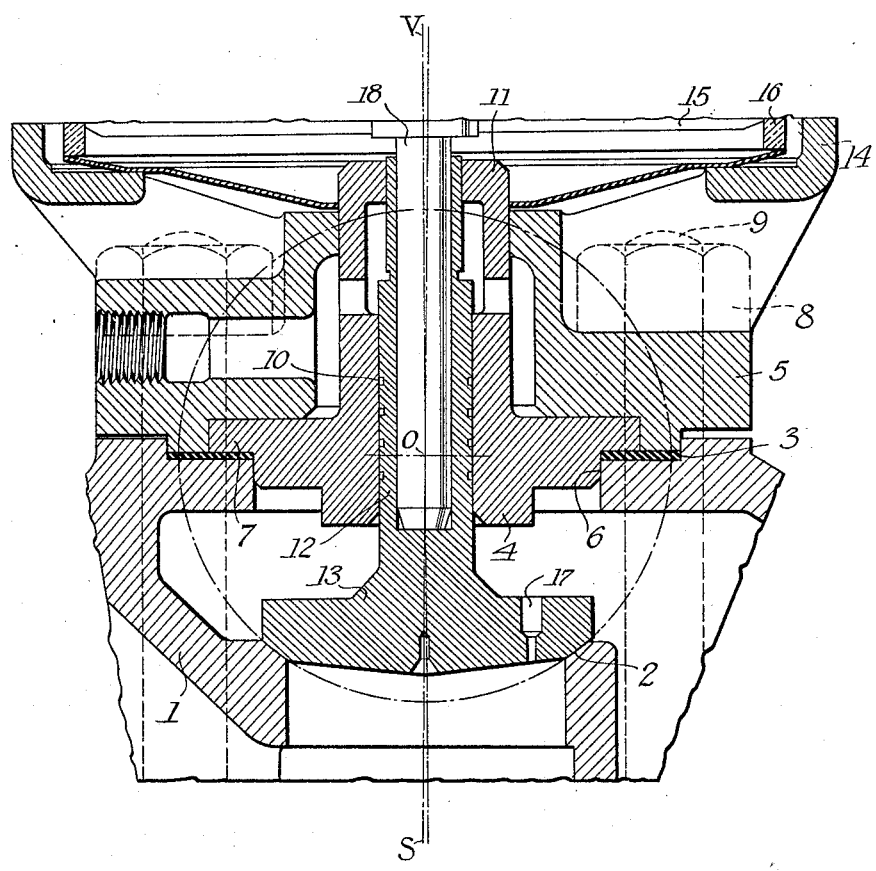

1,748,169

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

VALVE

Application filed May 3, 1928. Serial No. 274,951.

This invention relates to valves, and particularly to means for securing the accurate seating of a valve, guided in one part of a two part separable housing, upon a seat, mounted in the other part of the housing, despite moderate mis-alinement of the two parts of the housing.

Generally stated, the invention contemplates the use of a valve and a seat whose mating portions are spherical, the radius of the spherical portions being such that their common center lies in what may be called the plane of separation of the parts of the housing.

The invention is of particular importance where a compressible gasket is used between the parts of the housing, as in such case uneven compression of the gasket is apt to cause pronounced mis-alinement. Where a gasket is used the spherical surfaces are preferably centered in the median plane of the gasket, which in such case is substantially the plane of separation.

Some of the advantages of the invention can be secured when only one of the mating surfaces is strictly spherical. For example, if the width of either mating surface be diminished to zero it approaches a line, which in the strict geometrical sense is not a surface. This line, however, lies in the original spherical surface, and will seal properly with the spherical seat. Hence such arrangements embody the invention and are not excluded from the broad scope of my claims.

It is not new to provide a valve with a spherical seating surface nor to make use of a spherical seat, nor to use the two together. The prior art structures, however, do not secure the full advantage possible from spherical valves and seats for positively guided valves because the geometrical center of the spherical surfaces heretofore used was not at the point about which the parts tilt to their mis-alined positions.

The invention here claimed locates this center in the plane of separation of the housing, or, what is the equivalent, in the median plane of the compressible gasket, when such a gasket is used between the separable parts, so that if the parts of the housing are clamped together more tightly at one side than at the other the valve will merely be angularly displaced on the seat, by which displacement the valve and seat are obviously not operatively affected.

In the drawings, which is a fragmentary view of a steam pump governor used in railway air brake systems, and for similar purposes, one practical embodiment of the invention is shown. To develop the utility of the invention a condition is illustrated where the valve guide is clamped against the gasket more tightly at one side than at the other, so that the valve guide is canted or mis-alined.

A portion of a steam valve housing is shown at 1. It is provided with a valve seat 2 whose form is conventional, except for its spherical contour hereinafter defined. Mounted in the upper open side of the housing 1, within a centering and confining countersink, is a gasket 3. Seated on the gasket and centered in the countersink just mentioned are two members, the first a valve stem guide 4, and the second a clamping ring or spider 5. The guide member 4 is shouldered as shown at 6 so as to be accurately centered in the housing 1, and has a flange portion 7 which is engaged by a portion of the member 5 in such a way that when member 5 is clamped to the housing 1 by means of the nuts 8 on the studs 9, both the member 5 and the flange portion 7 of the member 4 will seal against and compress the gasket 3. The member 4 is provided with a sleeve-like upward extension 11, which projects through an opening in the center of the spider 5, and which is formed internally with a guide passage for the stem 12 of the steam valve 13. This stem is tubular and is provided on its exterior surface with grooves 10 to prevent leakage of steam along the valve stem. The guide 11 also contains certain chambers and ports which are not a feature of the present invention, which are disclosed and claimed in a prior application Serial No. 245,170, filed January 7, 1928, and which, therefore, need not be described in detail.

Mounted on the spider 5 is a cylinder housing, part of which appears at 14. This encloses the pressure motor for operating the valve 13. This motor may be of more or less conventional form and includes a piston 15 working in a cylinder bushing 16. The piston 15 carries a stem or rod 18 which projects into the tubular bore of the valve stem 12 and enters into thrust engagement with the valve 13 to force the same in a closing direction. Certain details of this arrangement are claimed in a prior application Serial No. 221,810, filed Sept. 24, 1927, and hence are not claimed in the present case. The valve is opened by steam pressure when permitted to open by the piston. The port 17 is merely a by-pass used in steam pump governor valves to permit sufficient steam to flow to the pump cylinder, when the valve is closed, to keep the pump cylinder warm.

The mode of operating the valve is immaterial to the invention here claimed and the exact construction of the parts of the valve is subject to variation. For example, except for manufacturing considerations affecting the particular valve chosen for illustration, there is no reason why the members 4 and 5 may not be constructed in one piece, and so far as the present invention is concerned they actually operate as one piece. It is not essential that the stem of the valve be tubular, or that it be piston-operated, or that it have a bleed port, such as the port 17.

The invention consists in forming the mating surfaces of the valve 13 and seat 2 as portions of equal spheres whose common center (in the closed condition of the valve) lies substantially in the median plane of the gasket 3. This center is also in the prolongation of the axis of the circular seat port.

While the invention derives its greatest utility when a compressible gasket of substantial thickness is used, for the reason that such a gasket may readily be unequally compressed on opposite sides, and is likely to be so unequally compressed in ordinary use, a similar effect, in a less degree, is observable even when no gasket is used. This follows from the fact that all metal is to some degree compressible.

While I prefer to use a valve and a seat each having an annular seating area of substantial width, it is obviously not necessary that they be of equal width and either might be diminished in width until it becomes in effect a line, and still preserve the geometrical relation characteristic of the present invention.

In the drawing the gasket is shown more tightly compressed at the left than at the right. The center of the spherical surfaces is at the point O. The axis of the valve seat is defined by the line O—S and the axis of the valve by the line O—V. The centering action of the shoulder 6 insures that these lines intersect at the point O, and the location of the point O in the median plane of the gasket insures that any displacement of the guide will be angular displacement about the point O. Such displacement does not affect the accuracy of seating of the valve, because of the peculiar form of the valve and seat as above explained.

What is claimed is,—

1. The combination of a valve housing formed in two parts separable on a plane, one part being provided with a valve seat and the other with a valve guide; means for clamping said parts together; and a valve guided in said guide and coacting with said seat, the mating surfaces of the valve and seat being portions of spheres whose common center lies substantially in the plane of separation of said parts.

2. The combination of a valve housing formed in two parts separable on a plane, one part being provided with a valve seat and the other with a valve guide; means for clamping said parts together; and a valve guided in said guide and coacting with said seat, at least one of the mating surfaces of said valve and seat being a portion of a sphere whose center lies substantially in the plane of separation of said parts.

3. The combination of a valve housing formed in two separable parts, one part provided with a valve seat and the other with a valve guide; a compressible gasket interposed between said parts; means for clamping said parts together; and a valve guided in said guide and coacting with said seat, the mating surfaces of the valve and seat being portions of spheres whose common center lies substantially in the median plane of the gasket.

4. The combination of a valve housing formed in two separable parts, one part provided with a valve seat and the other with a valve guide; a compressible gasket interposed between said parts; means for clamping said parts together; and a valve guided in said guide and coacting with said seat, at least one of the mating surfaces of the valve and seat being a portion of a sphere whose center lies substantially in the median plane of the gasket.

5. The combination of a valve housing having a valve seat; a valve guide supported on said housing; a compressible gasket interposed between said housing and guide; means for centering said guide relatively to said housing; means for clamping the guide against the gasket; and a valve guided by said guide and coacting with said seat, both the mating surfaces of the valve and seat being portions of spheres whose common center lies substantially in the median plane of the gasket.

6. The combination of a valve housing having a valve seat; a valve guide supported on said housing; a compressible gasket interposed between said housing and guide; means for centering said guide relatively to said housing; means for clamping the guide against the gasket; and a valve guided by said guide and coacting with said seat, at least one of the mating surfaces of the valve and seat being a portion of a sphere centered substantially in the median plane of said gasket.

In testimony whereof I have signed my name to this specification.

CHARLES A. CAMPBELL.